United States Patent
Trask et al.

[19]

[11] Patent Number: 6,034,711

[45] Date of Patent: Mar. 7, 2000

[54] SELF-INDICATING TEST PAGE FOR USE IN SETTING DENSITY LEVEL AND COLOR BALANCE IN A COLOR LASER PRINTER

[75] Inventors: Jeffrey L. Trask; Brian Hoffmann, both of Boise, Id.

[73] Assignee: Hewlett-Packard Company, Palo Alto, Calif.

[21] Appl. No.: 08/611,892

[22] Filed: Mar. 6, 1996

[51] Int. Cl.[7] .................................................. G03G 15/01
[52] U.S. Cl. ......................... 347/240; 347/251; 347/254; 399/39; 399/49; 399/72
[58] Field of Search .................................. 347/240, 254, 347/251; 399/39, 49, 72, 181

[56] References Cited

U.S. PATENT DOCUMENTS

| 4,310,248 | 1/1982 | Meredith | 356/402 |
| 5,604,567 | 2/1997 | Dundas et al. | 399/39 |

FOREIGN PATENT DOCUMENTS

| 0518525 | 12/1992 | European Pat. Off. | H04N 1/46 |
| 0658962 | 12/1995 | European Pat. Off. | H04N 1/60 |
| 62-251628 | 11/1987 | Japan | G01J 3/52 |
| 3-69272 | 3/1991 | Japan | H04N 1/46 |
| 4-170268 | 6/1992 | Japan | H04N 1/40 |

*Primary Examiner*—N. Le
*Assistant Examiner*—Hai C. Pham

[57] ABSTRACT

A test page, system, and method are used to set a color density level of a laser printer, by producing a dot gain test pattern. The laser printer has at least one primary color. The dot gain test pattern is self-indicating and thus requires no external reference in order to determine a correct color density level. A preferred embodiment of the dot gain test pattern includes (a) a stable pattern having a color density which is stable with respect to changes in the laser printer operating conditions, and (b) a sensitive pattern having a color density which is sensitive to changes in the operating conditions, wherein the sensitive pattern in reference to the stable pattern indicates the density level of the laser printer for the at least one primary color. Additionally, in a preferred embodiment, the stable pattern includes a uniform coarse dot pattern, and the sensitive pattern includes a gradient of fine dot densities, the gradient printed adjacent to the coarse dot pattern, wherein a correct density level of the laser printer for the at least one primary color is indicated when a mid-spectrum area of the fine dot gradient appears to blend into the coarse dot pattern.

11 Claims, 4 Drawing Sheets

SENSITIVITY VS. DOTS/LINES PER INCH

SELF-INDICATING TEST PAGE FOR USE IN SETTING DENSITY LEVEL AND COLOR BALANCE IN A COLOR LASER PRINTER

FIELD OF THE INVENTION

This invention relates in general to image transfer technology and, more specifically, to a self-indicating test page for use in setting color density level in a laser printer.

BACKGROUND OF THE INVENTION

In laser printers, both the engine electro-photographic (EP) process control tables and the formatter pulse-width (PW) control tables are based on print quality characterization done during life testing. However, factors such as the usage rate, EP process components, and printing environment will vary over time. It is not possible to anticipate how these factors will vary from life test conditions. Changes in these factors cause noticeable and typically objectionable color density differences between printers over time.

These color differences are a significant cause of service calls on color laser printers, which usually result in replacement of the drum cartridge and/or replacement of the color developer. Prior methods of correcting the color differences without a service call include installing optical density detectors inside the printer. The optical density detectors provide feedback to the printer which, in turn, adjusts the color density levels. This approach adds cost and complexity to the printer. Another approach is to print out a test page and to compare the test page with a reference page, typically included in the user's manual. This approach is inconvenient, because it requires the user to keep track of the reference page, and difficult, because it requires from the user the ability to accurately compare the test page with the reference page.

In order to maintain consistent color densities in offset printing, a dot gain test is used. In the color printing industry, offset printing is the standard for producing high quality, color results. A dot gain test compares the appearance of fine dots with the appearance of much coarser dots. The high perimeter/area ratio of the fine dots makes them much more sensitive to factors that cause more or less ink to be deposited. A gradient of fine dot densities is printed in a uniform coarse dot background. When viewed from a distance where the coarse dots cannot be independently distinguished, the mid-spectrum area of the fine dot gradient blends into the coarse dot background, if the color density is correct.

Accordingly, given the forgoing backgrounds relating to offset printing, color laser printers, and color density levels, objects of the present invention are to provide a new test page, system, and method for setting the color density level of a laser printer.

SUMMARY OF THE INVENTION

According to principles of the present invention in a preferred embodiment, a test page, system, and method are used to set a color density level of a laser printer, by providing a dot gain test pattern. The laser printer has at least one primary color. The dot gain test pattern is self-indicating and thus requires no external reference in order to determine a correct color density level.

A preferred embodiment of the dot gain test pattern includes (a) a stable pattern having a color density which is stable with respect to changes in the laser printer operating conditions, and (b) a sensitive pattern having a color density which is sensitive to changes in the operating conditions, wherein the sensitive pattern in reference to the stable pattern indicates the density level of the laser printer for the at least one primary color.

According to further principles of the present invention in a preferred embodiment, the stable pattern includes a uniform coarse dot pattern, and the sensitive pattern includes a gradient of fine dot densities, the gradient printed adjacent to the coarse dot pattern, wherein a correct density level of the laser printer for the at least one primary color is indicated when a mid-spectrum area of the fine dot gradient appears to blend into the coarse dot pattern.

Other objects, advantages, and capabilities of the present invention will become more apparent as the description proceeds.

DETAILED DESCRIPTION OF THE INVENTION

Figure 1:
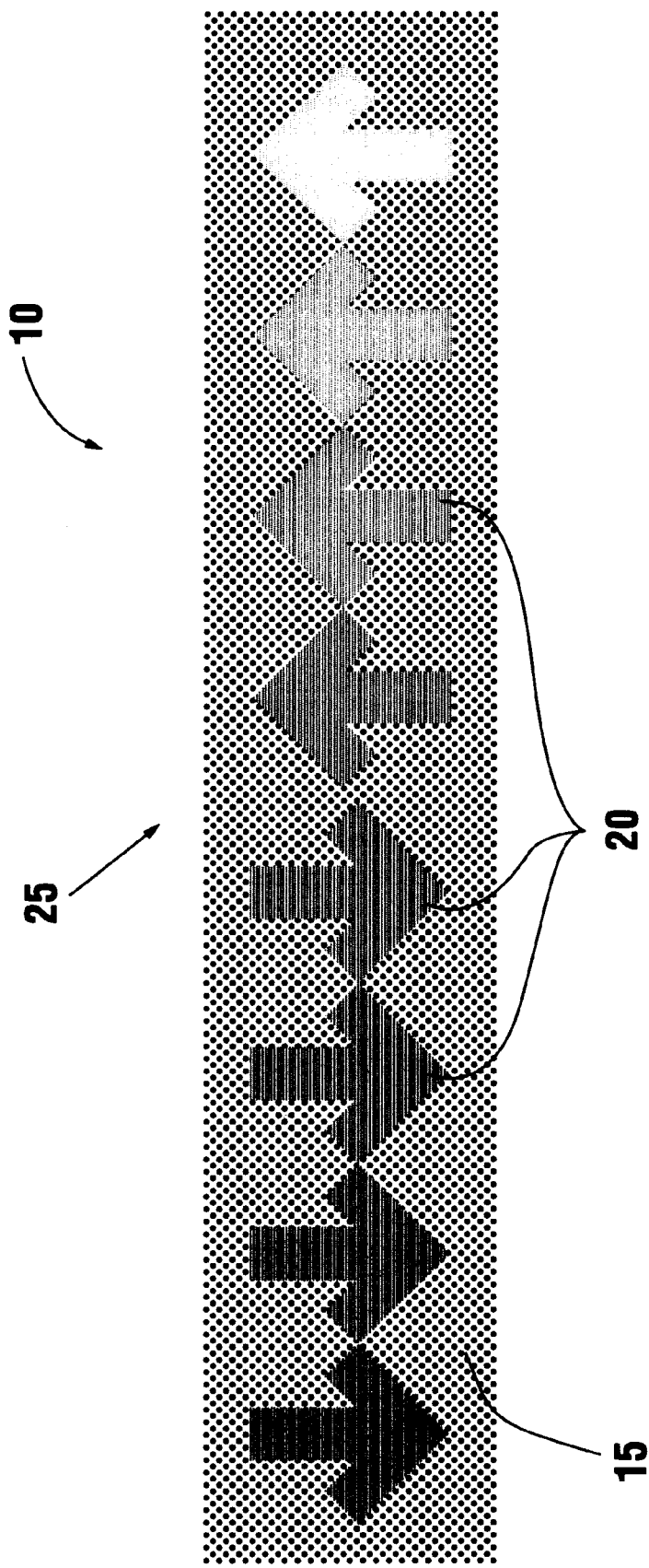
FIG. 1 is a dot gain test pattern produced by a laser printer using a preferred embodiment of the present invention.

FIG. 1 is a preferred embodiment of a dot gain test pattern 10 produced by a laser printer according to principles of the present invention for testing the optical density of a color of the laser printer. The test pattern 10 is typically printed on a test page by the laser printer. The dot gain test pattern 10 comprises a portion that is a uniform coarse dot pattern 15 and a portion that is a fine dot gradient 20. In this embodiment, arrows 20, disposed across the page, represent the fine dot gradient 20. Obviously, however, other patterns could equally be used. The coarse dot pattern 15 is uniform in optical density. In a preferred embodiment the coarse dot pattern 15 is 26 dots per inch (dpi). The fine dot gradient 20 varies in optical density, producing a spectrum ranging from high to low optical density. In the figure, high to low density is portrayed from left to right, varying from arrow 20 to arrow 20 across the page, each arrow 20 having a uniform density. The optical density of the fine dot gradient 20 is varied by pulse-width modulation of the laser beam to produce the spectrum of optical densities. In a preferred embodiment, the fine dot gradient 20 is 150 lines per inch (Lpi). In a laser printer with a correct density level, at some point along the fine dot gradient 20 (across the page), the optical density of the fine dots will essentially match the optical density of the uniform coarse dot background 15. A laser printer with a correct density level will produce patterns with an optical density of essentially 0.27±0.05. At the point where the optical densities essentially match, the fine dot gradient 20 will appear to blend in with the coarse dot background 15.

Although the test pattern 10 is shown using only the color black, the test pattern 10 will work equally well for any of the primary colors of a laser printer. For a typical laser printer, the only primary color is black (K). For a color laser printer the additional primary colors are typically cyan, magenta, and yellow (CMY).

In a preferred embodiment for a correct color density, the point at which the fine dot gradient 20 blends into the coarse dot pattern 15 is located in the area 25 mid-spectrum across the gradient 20. A correct color density indicates that no change in color density is needed. If the point at which the fine dot gradient 20 blends into the coarse dot pattern 15 is not located in the area 25 mid-spectrum across the gradient 20, then a need for a change in color density is indicated. In this embodiment, if the point at which the fine dot gradient 20 blends into the coarse dot pattern 15 is located to the left of the mid-spectrum area 25, then a need for an increase in color density is indicated. Conversely, if the point at which the fine dot gradient 20 blends into the coarse dot pattern 15 is located to the right of the mid-spectrum area 25, then a need for a decrease in color density is indicated.

The fine dots which make up the fine dot gradient 20 are actually fractions of a full dot. As such, the fine dots do not receive full exposure to the drum. The fine dots are very sensitive to changes in the operating conditions of the printer because of their less than full exposure to the drum. In contrast, the coarse dots are actually clusters of full dots. Each full dot receives full exposure to the drum. Accordingly, the coarse dots are not very sensitive to changes in the operating conditions of the printer. Changes in the operating conditions which may affect the color density produced by the laser printer include, but are not limited to, humidity, temperature, the discharge voltage of the photoconductor, laser power, developer AC bias, toner charge, and frequency of use.

Figure 2:
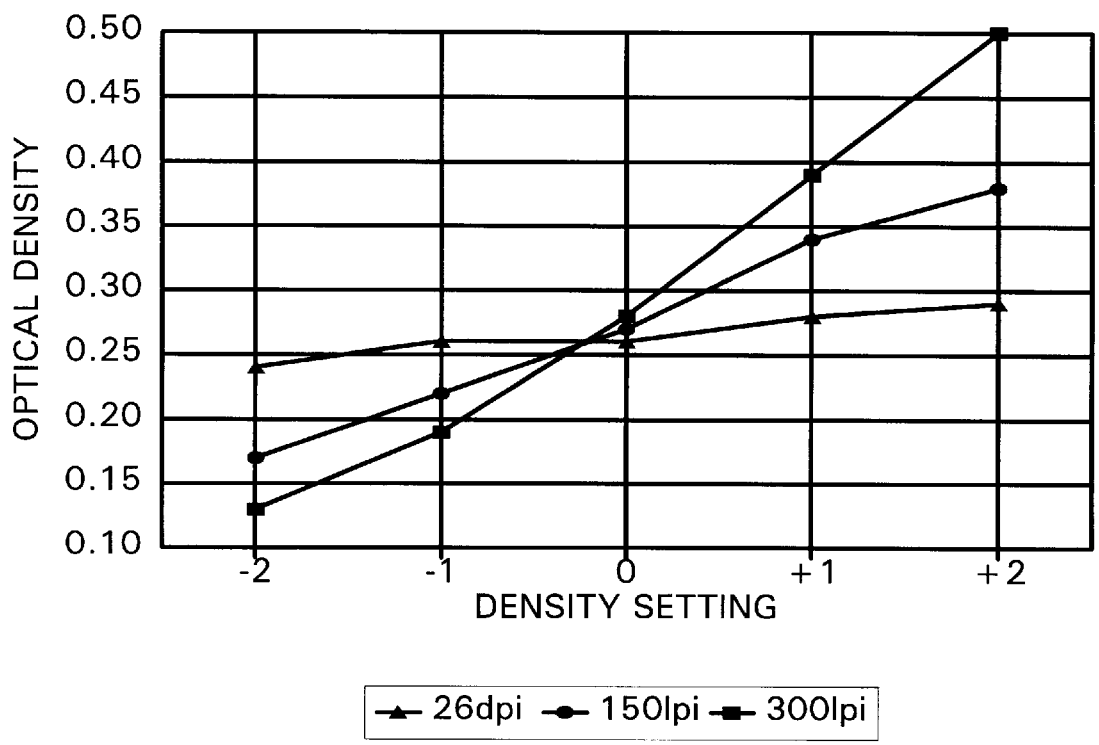
FIG. 2 is a graph showing the dot sensitivity to changes in developer AC bias voltage and/or laser power versus dots per inch or lines per inch.

Differences in sensitivity to the operating conditions can be demonstrated by showing how the different dot sizes react to a change in laser power and/or developer AC bias voltage. FIG. 2 graphically shows the difference in sensitivity between the fine dots and the coarse dots. The graph shows the relationship between the dpi (or Lpi) and the change in optical density caused by a change in laser power and/or developer AC bias voltage. These changes in laser power and/or developer AC bias voltage are represented by changes in a density setting. In general, as the setting increases, the laser power increases and the developer AC bias increases.

The graph clearly shows that as the dpi (or Lpi) increases over the range from 26 dpi to 300 Lpi, the effect of a change in density setting on the optical density, also increases. At 26 dpi, the optical density varies from approximately 0.24 to 0.29 for a change in density setting from −2 to +2. At 300 Lpi, the optical density varies from approximately 0.13 to 0.50 for the same change in density setting.

Since the fine dots are much more sensitive to the operating conditions than the coarse dots, the optical density of the fine dots is affected much more than the optical density of the coarse dots by a change in the operating conditions. Therefore, a change in operating conditions results in a shift of the area along the fine dot gradient 20 where the fine dots appear to blend into the coarse dot background. The coarse dot pattern 15 acts as a stable reference compared to the fine dot gradient 20, thus the test page is self indicating and no external reference is needed.

Since the fine dot gradient 20 is affected more than the coarse dot pattern 15 by changes in operating conditions, the coarse dot pattern 15 has a stable optical density, relative to the optical density of the fine dot gradient 20, for all acceptable operating conditions. Acceptable operating conditions are those operating conditions which allow the laser printer to function properly as a laser printer.

The dot gain test pattern 10 is self-indicating because no external reference is needed in order to determine if the color density is correct. Other types of test patterns for laser printers are not self-indicating because they rely on a comparison between the test pattern and some external reference. Typically the external reference is included in the user's manual. The external reference could also be the memory of the user. If a user has to look at a test pattern and use judgement to determine if the color density appears correct, the user's memory of what a correct color density looks like is an external reference.

In order to remedy an incorrect color density, compensation is made to account for the change in operating conditions from life test conditions. The process control engine for the laser printer has the ability to modify the developer AC bias voltage and the laser power. In a preferred embodiment, adjustments in the laser power and/or developer AC bias voltage from the normal electro-photographic (EP) process tables are represented by a change in a density setting. As discussed above, typically, as the setting increases, the laser power increases and the developer AC bias increases.

The area along the fine dot gradient 20 that blends in with the coarse dot pattern 15 will be shifted by a change in the developer AC bias voltage or the laser power. This shift is due to the difference in how the fine dot gradient 20 and the coarse dot pattern 15 are affected by the change in the developer AC bias voltage and the laser power. The density setting is adjusted in reference to the dot gain test pattern 10 which indicates whether the color density is too low or too high.

Figure 3:
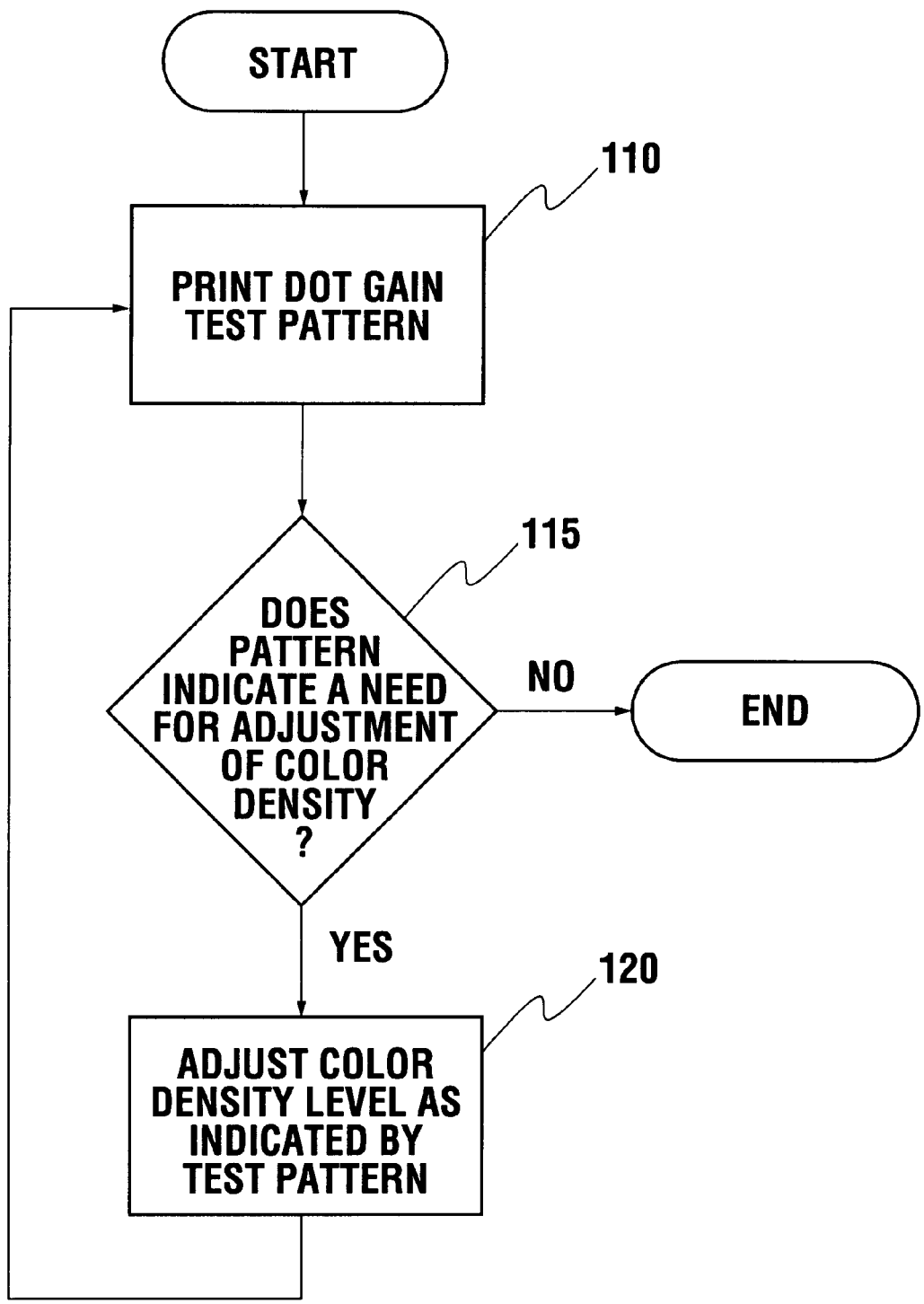
FIG. 3 is a flow chart showing a preferred method of the present invention.

FIG. 3 is a flow chart showing a preferred method of the present invention. Referring to FIGS. 1 and 3, the first step is to print 110 a dot gain test pattern 10 in a primary color. Next, the test pattern 10 is examined by a user 115. The test pattern 10 indicates whether the color density needs to be adjusted and whether the color density needs to be increased or decreased. If the color density does need to be adjusted, the user adjusts the color density 120 as indicated for the primary color in which the test pattern 10 was printed. Another dot gain test pattern 10 is then printed 110 in the same color as the first dot gain test pattern 10. If the test pattern 10 indicates that another adjustment in color density is necessary, the process is repeated until the color density for the tested color is correct.

Although reference has been made only to one dot gain test pattern 10 on the test page, it is noted that multiple dot gain patterns 10, each for a different primary color may be printed on each test page.

In addition to a dot gain test, a gray balance test may be printed on the test page. A gray balance test is also referred to as a neutral gray test. A gray balance test is employed in order to balance the color densities of the primary colors, typically CMY. The gray balance test is also a more visible way to check for the correct amount of yellow color density than the dot gain test pattern 10.

In order to balance the color densities of the primary colors, a light neutral gray area is produced using only the primary colors CMY. Another light neutral gray area is produced using only the color black. The two areas of light neutral gray are compared. If the balance of CMY colors is not correct, the "neutral gray" produced with only CMY will have a noticeable hue compared to the same neutral gray produced with only black.

Figure 4:
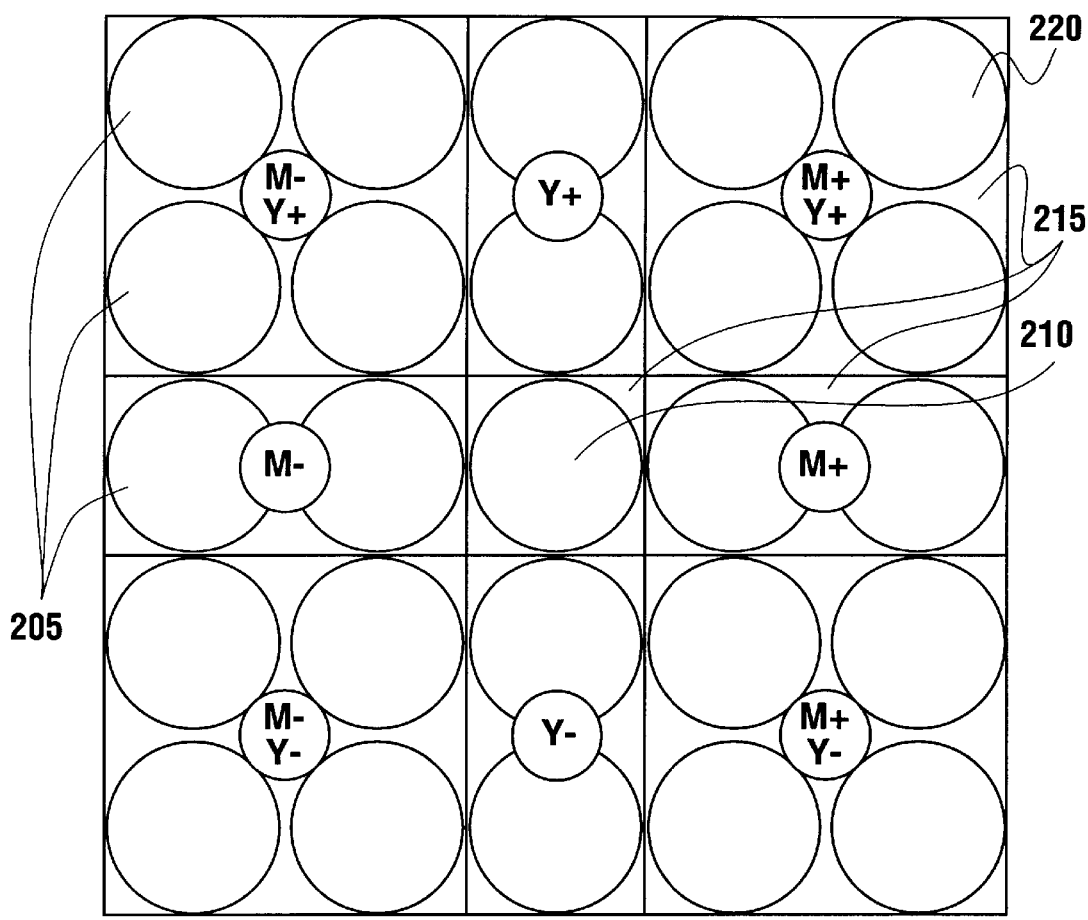
FIG. 4 is a preferred embodiment of a gray balance test pattern.

In a preferred embodiment, the gray balance test pattern is composed of 25 circles in a grid, as shown in FIG. 4. The grid background 215 is a light neutral gray color composed of black only. The circles 205 are also a light neutral gray color, but composed of CMY only. Each circle has a slightly different hue representative of a high or low density of one or two of the primary colors. The circles are arranged so that they constitute a two directional spectrum ranging from low to high density for each of two primary colors in each of the two directions. In this embodiment, the density of yellow varies from low to high in the direction from the bottom of the pattern to the top and magenta varies from low to high in the direction from left to right.

The center circle 210 of the gray balance test should match the background 215. If the center circle 210 does not match the background 215, a change in color density is indicated. If a circle other than the center circle 210 matches the background 215, the test pattern indicates how the density levels should be changed in order to obtain a correct color balance.

For example, if the upper right circle 220 matches the background 215, the magenta and yellow color density levels are both too low. Since the matching circle 220 is two circles away from the center circle 205 in both the horizontal and vertical directions, both magenta and yellow should be increased by two density levels.

In summary, what has been described above are the preferred embodiments for a system and method for setting the color density level of a laser printer and a test page for use in setting the color density level of a laser printer. While the present invention has been described by reference to specific embodiments, it will be obvious that other alternative embodiments and methods of implementation or modification may be employed without departing from the true spirit and scope of the invention.

What is claimed is:

1. A test page produced by a laser printer, the laser printer having at least one primary color, the test page for setting a density level of the laser printer for the at least one primary color, the test page comprising:
    (a) a stable pattern having a color density which is stable with respect to changes in operating conditions of the laser printer;
    (b) a sensitive pattern having a color density which is sensitive to changes in the operating conditions of the laser printer; and,
        wherein the sensitive pattern in reference to the stable pattern indicates, without reference to any other source, the density level of the laser printer for the at least one primary color.

2. The test page of claim 1 wherein the stable pattern includes a uniform coarse dot pattern, and wherein the sensitive pattern includes a gradient of fine dot densities, the gradient printed adjacent to the coarse dot pattern, wherein a correct density level of the laser printer for the at least one primary color is indicated when a mid-spectrum area of the fine dot gradient appears to blend into the coarse dot pattern.

3. The test page of claim 1 wherein at least one primary color is selected from the group consisting of black, cyan, magenta, and yellow.

4. The test page of claim 1 further including a gray balance test pattern.

5. The test page of claim 4 wherein at least one primary color is selected from the group consisting of black, cyan, magenta, and yellow.

6. A system for setting a color density level of a laser printer, the laser printer having at least one primary color, the system comprising:
    (a) means for producing a stable pattern having a color density which is stable with respect to changes in operating conditions of the laser printer;
    (b) means for producing a sensitive pattern having a color density which is sensitive to changes in the operating conditions of the laser printer; and,
        wherein the sensitive pattern in reference to the stable pattern indicates, without reference to any other source, the density level of the laser printer for the at least one primary color.

7. The system of claim 6 wherein the stable pattern includes a uniform coarse dot pattern, and wherein the sensitive pattern includes a gradient of fine dot densities, the gradient printed adjacent to the coarse dot pattern, wherein a correct color density level of the laser printer for the at least one primary color is indicated when a mid-spectrum area of the fine dot gradient appears to blend into the coarse dot pattern.

8. A method for setting a color density level of a laser printer, the laser printer having at least one primary color, the method comprising:
    (a) printing a stable pattern having a color density which is stable with respect to changes in operating conditions of the laser printer;
    (b) printing a sensitive pattern having a color density which is sensitive to changes in the operating conditions of the laser printer, wherein the sensitive pattern in reference to the stable pattern indicates, without reference to any other source, the density level of the laser printer for the at least one primary color of the laser printer; and,
    (c) adjusting the color density level of the laser printer for the at least one primary color based on visual observation of the sensitive pattern in reference to the stable pattern.

9. The method of claim 8 wherein the stable pattern includes a uniform coarse dot pattern, and wherein the sensitive pattern includes a gradient of fine dot densities, the gradient printed adjacent to the coarse dot pattern, wherein a correct color density level of the laser printer for the at least one primary color is indicated when a mid-spectrum area of the fine dot gradient appears to blend into the coarse dot pattern.

10. The method of claim 8 further including repeating steps (a) and (b) until the color density level is correct.

11. The method of claim 8 further including:
    (a) printing a gray balance test pattern; and,
    (b) further adjusting the color density level of the laser printer for the at least one primary color based on visual observation of the gray balance test pattern.

* * * * *